United States Patent Office 3,651,016
Patented Mar. 21, 1972

3,651,016
METHOD FOR THE PRODUCTION OF FILM- AND FIBER-FORMING POLYESTERS WITH A NOVEL METALLIC CATALYST
Josef Hrach and Theodor Wimmer, Tyrol, Austria, assignors to Alpine Chemische Aktiengesellschaft, Kufstein, Tyrol, Austria
No Drawing. Filed Dec. 21, 1967, Ser. No. 692,275
Claims priority, application Austria, Dec. 30, 1966, 12,053/66; June 2, 1967, 5,144/67
Int. Cl. C08g *17/013*
U.S. Cl. 260—75 R    5 Claims

ABSTRACT OF THE DISCLOSURE

Film- and filament-forming color-stable polyesters or copolyesters of dicarboxylic acids, such as terephthalic, iso-phthalic, diphenyldicarboxylic and adipic acids, and a diol, such as ethylene glycol, 1,4-bis(hydroxy methyl) cyclohexane and bis-phenol-A-diglycolether, are reacted under polymerizing conditions in the absence of oxygen and in the pressure of a polymerization catalyst consisting of a mixture of (a) metallic antimony, (b) metallic lead, and (c) metallic zinc. Instead of a dicarboxylic acid, a functional, polyester-forming derivative thereof may be used, preferably the dimethyl ester. The lead component (b) of the catalyst may be replaced in whole or part by tin, and the catalyst preferably is in the form of an alloy.

---

This invention relates to a process for the production of polyesters which exhibit improved properties owing to the use of new catalysts. In the following disclosure the term "polyesters" is used to denote both polyesters and copolyesters.

The method of producing polyesters from one or more aromatic and/or aliphatic dicarboxylic acids or their functional, polyester-forming derivatives and aliphatic and/or cyclic diols is known. In the polyesters of greatest technical importance the major proportion of the acid component is terephthalic acid. The other acids employed include iso-phthalic, 5-sulpho-iso-phthalic, diphenyldicarboxylic, diphenylsulphondicarboxylic, 2,6-naphthalenedicarboxylic, adipic and sebacic acids. Ethylene glycol is the most commonly used diol component; others are 1,4-butanediol, 1,4-bis-[hydroxymethyl]-cyclohexane and 2,2-bis-[4'-β-hydroxyethoxyphenyl]-propane, also referred to as bis-phenol-A-diglycolether. Small amounts of compounds forming cross linkages may be condensed with the polyesters, for example trivalent or multivalent carboxylic acids, alcohols or phenols, unsaturated aliphatic dicarboxylic acids, or 2,5-dihydroxyterephthalic acid. Typical products of this nature and a process for their production are described, for example, in British Pat. 578,079, U.S. Pat. 2,901,466, French Pat. 1,438,863, and the German "Auslegeschrift" 1,052,683. The general practice is to re-esterify the dimethylester of the dicarboxylic acid with the glycol in the first stage of the process and to polycondense the resulting diglycol ester in the second stage to yield the polyesters.

Catalysts are added to the reaction mixture to accelerate esterification. Quite a number of metals and metal alloys have been suggested for this purpose, among many others also antimony, tin, lead and zinc, and alloys of antimony and tin, tin and lead, and zinc and tin. Many of the common catalysts are not sufficiently effective, while others are highly effective but yield polyesters showing insufficient colour and heat stability. Consequently phosphorus compounds or other stabilizing agents have to be added to the reaction mixture. These additions too have a detrimental effect on other properties of the polyester, for example its mechanical and electrical properties.

It has been found that mixtures or alloys of (a) antimony, (b) tin and/or lead, and (c) zinc have highly effective catalytic action, while their adverse effect on the properties of the final polyester is very slight indeed. The mixtures or alloys of these new catalysts are generally employed in amounts of approximately 0.005 to 1% by weight, or more particularly 0.01 to 0.5% by weight, in relation to the total amount of dicarboxylic acids or of the functional derivatives (e.g. the alkyl esters, wherein the alkyl radical contains 1 or 2 carbon atoms) of these acids that are employed in the reaction. They may consist, for example, of 20 to 70% by weight of antimony, 20 to 70% by weight of tin and/or lead, and 4 to 50% by weight of zinc; the preferred composition is 35 to 50% by weight of antimony, 35 to 50% by weight of tin and/or lead, and 5 to 30% by weight of zinc.

The greatest advantage is gained by using alloys of two or three metals as catalysts constituents. These alloys can be produced by melting the individual metals with vacuum or under an inert gas, the product being subsequently pulverized. It is not necessary, however, to employ the metal catalyst in a particularly fine state of division; it can be prepared in the form of chips or cut wire. The term esterification is intended to comprise the direct esterification, re-esterification and polycondensation individually or in combination.

The polyester can be produced, for example, by heating a mixture of terephthalic acid dimethylester, ethylene glycol and 0.1% by weight of one of the new catalysts under nitrogen and with constant stirring. In the first stage of the reaction, the re-esterification stage, methanol and ethylene glycol distill off at temperatures up to about 250° C. under normal pressure. In the second stage of the reaction, polycondensation takes place at temperatures of approximately 240° to 300° C., or preferably 265° to 275° C., under reduced pressure. The resulting polyester melt is driven out of the reaction vessel and is granulated or cut into chips in the usual manner. This is followed by drying to a moisture content of less than 0.02 part by weight. The known techniques are employed for the further processing of the polyester to the desired article, for example as filament, flat film or other shaped goods.

In the following examples the parts and percentages are by weight and the temperatures in degrees centigrade. The intrinsic viscosity values were determined with a solution of 0.5 gram of the polyester in 100 milliliters of a mixture of equal parts of phenol and tetrachlorethane.

EXAMPLE 1

A mixture of 200 parts of terephthalic acid dimethylester, 160 parts of ethylene glycol and 0.1 part of a pulverized alloy of 46% antimony, 46% lead and 8% zinc is heated with stirring in the absence of atmospheric oxygen. Over a period of 2½ hours, at 250°, methanol and ethylene glycol distill off. Stirring is continued for 2¾ hours at about 265° and 0.45 to 0.50 torr, after which pure nitrogen is conducted into the reaction vessel. A sample of the polyester thus obtained melts at 258–260° and has an intrinsic viscosity of 0.69.

Stirring is continued at 265° and further samples are taken from time to time, they are found to have the following intrinsic viscosities: 0.69 after 20 minutes, 0.68 after one hour and 0.68 after two hours. These polyester samples and the initial sample are all virtually colourless.

EXAMPLE 2

The procedure of Example 1 is adopted, except that the reaction mixture is held for 2½ hours at 254° instead of 250°, after which, as before, stirring is continued for 2¾ hours at about 265° and 0.4–0.5 Torr. At this point pure nitrogen is blown into the mixture. A sample of the polyester formed melts at 257°–259° and its intrinsic viscosity is 0.73.

The temperature may be increased to 280° and stirring continued with further samples taken from time to time. These have the following intrinsic viscosity values:

0.71 after 15 minutes
0.69 after 30 minutes
0.68 after 60 minutes
0.65 after 120 minutes.

The final sample only is of very pale yellowish colour.

EXAMPLE 3

A mixture of 200 parts of terephthalic acid dimethylester, 150 parts of ethylene glycol, 31.6 parts of 2,2-bis-[4' - β-hydroxy-ethoxyphenyl]-propane (bis-phenol-A-diglycolether) and 0.1 part of an alloy of 46% antimony, 46% lead and 8% zinc is reacted with heating under the conditions given in Example 1. The product is a copolyester with an intrinsic viscosity of 0.68 which melts at 236–238°.

The reaction mixture may be raised to 280° under pure nitrogen without vacuum, samples taken after set times have the following intrinsic viscosities:

0.63 after 15 minutes
0.62 after 30 minutes
0.62 after 60 minutes
0.62 after 120 minutes.

The copolyester remains practically colourless to the very end.

The products obtained in accordance with the procedures detailed in the examples are suitable for spinning and form cold drawable filaments having good end use properties.

Having thus disclosed the invention what we claim is:

1. A process for the production of polyesters capable of film and filament formation comprising reacting at least one lower alkyl ester of a dicarboxylic acid selected from the group consisting of terephthalic acid, isophthalic acid, 5-sulfoisophthalic acid, diphenyl dicarboxylic acid and 2,6-naphthalene dicarboxylic acid with at least one diol selected from the group consisting of ethylene glycol, 1,4-butanediol, 1,4-(hydroxy methyl)-cyclohexane and 2,2'-bis-(4'-β-hydroxy ethoxy phenyl)-propane in the presence of a tricomponent metallic catalyst suitable for catalyzing re-esterification and polycondensation stages of said process for the production of said esters, said tricomponent catalyst being selected from the group consisting of (a) 20 to 70 percent by weight of antimony, (b) 20 to 70 percent by weight of lead and (c) 4 to 50 percent by weight of zinc and (a') 20 to 70 percent by weight of antimony, (b') 20 to 70 percent by weight of tin and (c') 4 to 50 percent by weight of zinc, said catalyst being present in an amount of 0.005 to 1 percent by weight based on the total amount of lower alkyl ester employed in the process.

2. A process according to claim 1 in which the catalyst is an alloy of said metals.

3. A process according to claim 2 wherein the tricomponent metallic catalyst is selected from the group consisting of (a) 35 to 50 percent by weight of antimony, (b) 35 to 50 percent by weight of lead and (c) 5 to 30 percent by weight of zinc and (a') 35 to 50 percent by weight of antimony, (b') 35 to 50 percent by weight of tin and (c') 5 to 30 percent by weight of zinc.

4. A process according to claim 1 in which the catalyst is present in an amount from 0.01 to 0.5 percent by weight.

5. A process for the production of film and filament forming polyethylene terephthalate comprising reacting dimethyl terephthalate with ethylene glycol at a temperature of up to about 250° C. in the presence of a pulverized tricomponent alloy catalyst consisting of from 20 to 70 percent by weight of antimony, 20 to 70 percent by weight of lead and 4 to 50 percent by weight of zinc for catalyzing re-esterification and polycondensation stages of said polyester formation, distilling off methanol and ethylene glycol, raising the distilland temperature to from 240–300° C. and maintaining said temperature under reduced pressure until film and filament forming polyethylene terephthalate is formed, said catalyst being present in an amount of from 0.005 to 1 percent by weight based on the amount of dimethyl terephthalate employed.

References Cited

UNITED STATES PATENTS

| | | | |
|---|---|---|---|
| 2,465,319 | 3/1949 | Whinfield et al. | 260—75 |
| 3,053,810 | 9/1962 | Griehl et al. | 260—75 |
| 3,073,801 | 1/1963 | Siggel | 260—75 |
| 3,079,368 | 2/1963 | Lundberg | 260—75 |
| 3,055,867 | 9/1962 | Lebras et al. | 260—75 |
| 3,118,861 | 1/1964 | Wiener | 260—75 |

FOREIGN PATENTS

| | | | |
|---|---|---|---|
| 610,137 | 10/1948 | Great Britain | 260—75 |
| 740,381 | 11/1955 | Great Britain | 260—75 |

MELVIN GOLDSTEIN, Primary Examiner

U.S. Cl. X.R.

260—47 C, 475 P